United States Patent [19]

Bates

[11] Patent Number: 4,767,438

[45] Date of Patent: Aug. 30, 1988

[54] APPARATUS FOR CLEANING MATERIAL TRANSPORTING ROLLERS

[75] Inventor: William G. Bates, Sellersville, Pa.

[73] Assignee: Mroczek, Inc., Sellersville, Pa.

[21] Appl. No.: 138,448

[22] Filed: Dec. 23, 1987

[51] Int. Cl.⁴ ............................................. C03B 13/18
[52] U.S. Cl. ........................................ 65/168; 65/348; 15/256.53; 51/49; 51/88; 51/179; 51/252
[58] Field of Search ................. 65/348, 351, 118, 120, 65/168; 51/88, 49, 179, 252; 15/256.53

[56] References Cited

U.S. PATENT DOCUMENTS

| | | | |
|---|---|---|---|
| 1,246,535 | 11/1917 | Briercliffe et al. | 15/256.53 |
| 1,689,656 | 10/1928 | Williams | 51/252 X |
| 1,741,494 | 12/1929 | Banfield | 51/252 |
| 3,165,865 | 1/1965 | Bousquet et al. | 51/251 |
| 3,398,489 | 8/1968 | Rohrer | 51/49 X |
| 3,481,727 | 12/1969 | Dickinson et al. | 65/168 |
| 4,042,364 | 8/1977 | King et al. | 65/168 |
| 4,418,503 | 12/1983 | Dantinne | 51/252 |

Primary Examiner—Arthur Kellogg
Attorney, Agent, or Firm—Chernoff, Vilhauer, McClung & Stenzel

[57] ABSTRACT

The roller cleaning apparatus of the present invention includes a frame which has a pair of caster mounted wheels located at one of its ends. The casters are connected to one another through a tie-rod which causes them to turn as a unit between a right-hand facing orientation and a left-hand facing orientation. The wheels have a diameter which permits them to span an adjacent pair of the rollers which are to be cleaned. Thus, if the rollers are rotating the apparatus translates across the rollers toward the right when the casters are in their right-hand orientation and toward the left when the casters are in their left-hand orientation. A spring normally urges the casters to their right-hand orientation, however, a latch mechanism locks them in their left-hand orientation when they are manually placed there. The latch mechanism has a release device which automatically releases it when the apparatus reaches the left-hand side of the rollers. A hone mounted on the other end of the frame contacts one of the rollers when the wheels are located between another pair of them. Thus, the hone cleans the roller as the apparatus translate back and forth across it. A ballast bar mounted on the frame supplies the necessary weight to the hone to make it work. Water from a tank mounted on the frame is dispensed into the roller being cleaned from a distribution tube which is located adjacent to the hone.

12 Claims, 2 Drawing Sheets

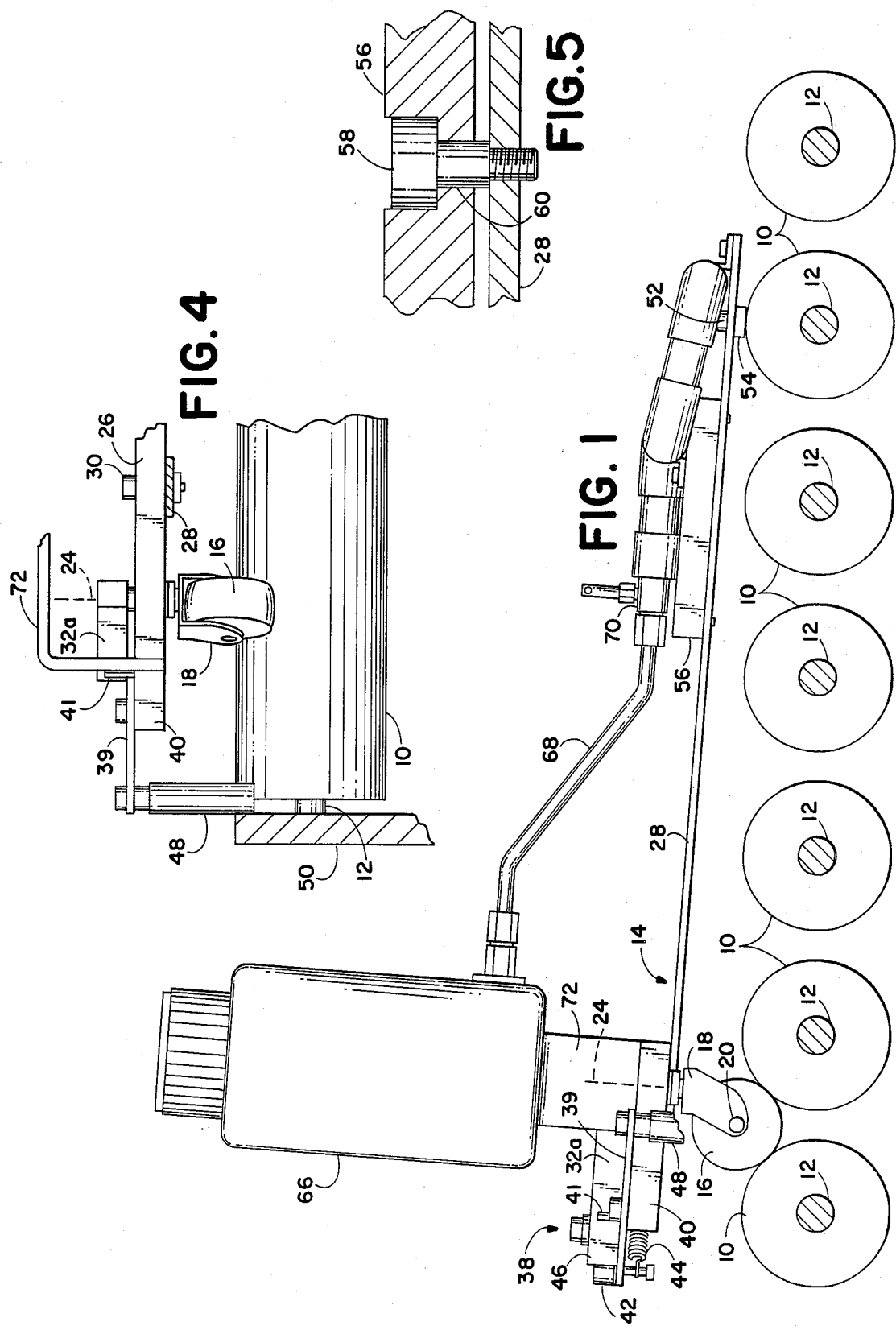

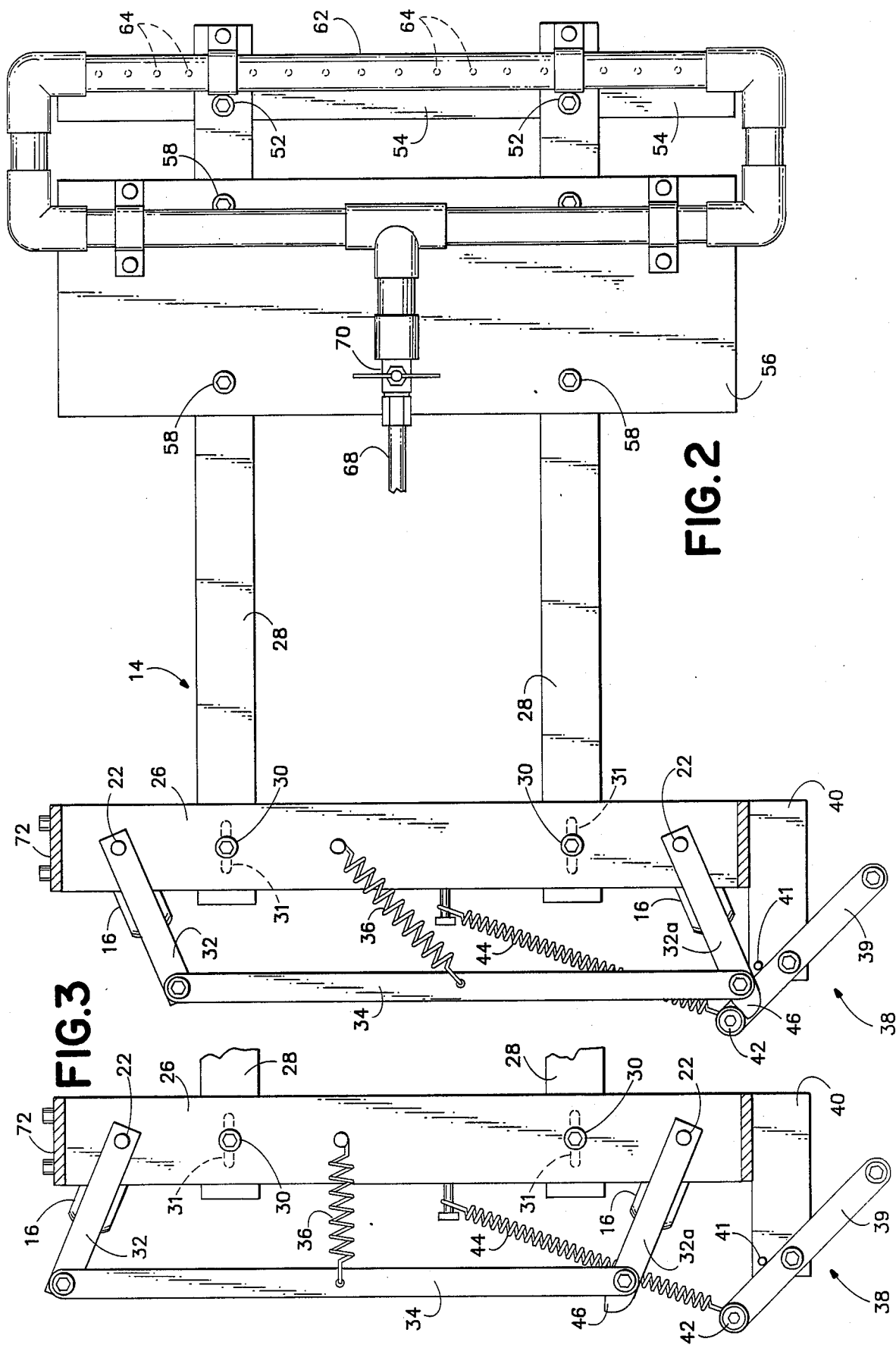

APPARATUS FOR CLEANING MATERIAL TRANSPORTING ROLLERS

BACKGROUND AND SUMMARY OF THE INVENTION

This invention relates to an apparatus for cleaning material transporting rollers and in particular to such a device which does not require that the rollers be removed from the device they are associated with.

In many industrial processes material being processed is transported on a series of side-by-side rollers. In some of these applications the material that is being processed leaves a deposit on the rollers which must periodically be removed or it will disfigure the material. This situation occurs, for example, with glass tempering furnaces where the glass must be transported on extremely smooth ceramic rollers since the glass is heated during the tempering process to where it is easily marked by any irregularities on the rollers. Since the glass is cut and its edges are ground smooth prior to tempering, glass shavings are created and they often are carried by the glass onto the rollers. At the high tempering temperature these shavings become fused to the rollers and must be removed periodically.

Heretofore these rollers were cleaned by removing them from the tempering furnace and mounting them on a remote cleaning apparatus. This not only required allowing the furnace to cool substantially to room temperature but was a slow and expensive procedure. While devices have been developed which clean rollers of this type in place, they all have shortcomings which have prevented their being widely used.

Some of these cleaning devices, such as shown in Dickinson et al., U.S. Pat. No. 3,481,727, are permanently or semi-permanently attached to a pair of rollers. Since a tempering furnace has a large number of rollers, the use of cleaning apparatus of this type would be quite expensive.

Alternately some of the prior art devices, such as that shown in Banfield, U.S. Pat. No. 1,741,494, clean all of the rollers at one time. Such a device is expensive to make, and, if used on a machine having a large number of rollers would be quite heavy and difficult to use.

Bousquet et al., U.S. Pat. No. 3,165,865 discloses a cleaning apparatus which is capable of being moved from roller to roller, however, it is designed for permanent installation on one roller and moving it would be difficult. Thus it is not feasible to use the Bousquet et al. device to clean a large number of rollers, such as is necessary with a tempering furnace.

While King et al., U.S. Pat. No. 4,042,364, discloses a roller cleaning apparatus which can be moved easily from roller to roller, it is designed to operate in a track which is unique to the particular device on which it is designed to be used. Thus, the roller cleaner of King et al. cannot be used to clean rollers in the other devices and has extremely limited use.

None of the prior art roller cleaners can be used to clean the rollers of a multiple roller device easily and inexpensively while the rollers remain in the device. Accordingly, none of them are useful in cleaning the rollers in existing glass tempering furnaces and other similar devices.

The present invention overcomes the difficulty of the prior art by providing a portable frame which can easily be moved from roller to roller by the user. Located at one end of the frame are a pair of caster mounted wheels which have a diameter which causes them to contact adjacent rollers they are placed between. The castors are interconnected by a tie-rod to rotate together between a right-hand orientation and a left-hand orientation. When the casters are in their right-hand orientation the wheels will cause the frame to translate across the rollers toward the right when the rollers are rotated, and when the casters are in their left-hand orientation the frame will translate across the rollers toward the left.

The tie-rod is biased by a spring to normally place the casters in their right-hand orientation. However, a latch mechanism locks the casters in their left-hand orientation when they are moved there manually. The latch mechanism is arranged such that when the apparatus has completely traversed across the rollers toward the left a release element will strike the support which carries the rollers and release the latch. When this happens the spring will return the casters to their right-hand orientation and the frame will reverse its direction and move back across the rollers toward the right.

Located at the other end of the frame is an elongate hone which rests on one of the rollers when the wheels are placed between another pair of rollers. The front crossbar of the frame, which carries the casters, can be located at various locations along the frame side rails in order to permit the distance between the wheels and the hone to be adjusted to accommodate different roller separations. A ballast plate is removably attached to the side rails adjacent to the hone in order to provide the weight necessary for the hone to work. The ballast plate is arranged for easy replacement so that heavier or lighter ballast plates can be used depending on the grit of the hone and how much cleaning action is required.

The front crossbar, the ballast plate, and the hone all are attached to the side rails in a manner which permits a small amount of movement between them. This allows the wheels and hone to remain in contact with the rollers even if the rollers are not perfectly flat or their axes are not totally parallel.

Mounted on the frame, over the top of the wheels, is a tank which carries water which is used to wash the rollers while they are being cleaned. The tank is connected to a distribution tube having holes in its lower surface through a hose having a shut-off valve located in it. The distribution tube extends across the entire extent of the hone and is located adjacent to it. Since the water tank is located above the wheels it provides the weight necessary for the wheels to cause the apparatus to translate along the rollers and not to ride out of them.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevation view of a roller cleaning apparatus embodying the features of the present invention.

FIG. 2 is a plan view of the roller cleaning apparatus of claim 1, partially broken away to show hidden detail.

FIG. 3 is a fragmentary plan view of the apparatus, partially broken away to show hidden detail, showing the wheels placed in a different orientation.

FIG. 4 is a fragmentary front elevation view of the apparatus.

FIG. 5 is a detail view, at an enlarged scale, showing one portion of the apparatus.

PREFERRED EMBODIMENT OF THE INVENTION

Referring to FIGS. 1 and 2 of the drawings, the present invention is used to clean long cylindrical spaced-apart rollers 10 of the type which are used to transport material. The rollers rotate about their central axes on axles 12 and each roller is separated from its adjacent roller by a similar predetermined distance. In most applications there are far more rollers than shown in FIG. 1 and they are made from a hard, high temperature material, such as ceramic.

The cleaning apparatus comprises a frame 14 which supports the remaining operative elements. The frame is made from aluminum or another nonoxidizing material to prevent oxides from forming which might scratch the rollers 10. Mounted at one end of the frame is a pair of wheels 16 which are mounted in caster bodies 18. The wheels rotate in the caster bodies about a rolling axis 20, and have a diameter which permits them to contact the sides of adjacent rollers when placed between them. Thus, if the rollers are rotated about their central axes the wheels rotate also. The wheels preferably are made from a hard plastic material that will not leave a residue on the rollers when burned. The caster bodies have shanks 22 which are rotatably mounted on the frame and allow the caster bodies to rotate about pivot axes 24 which are normal to the rolling axes 20. The shanks are mounted in a front crossbar 26 of the frame 14 which in turn is attached by means of bolts 30 to side rails 28, which make up the longitudinal extent of the frame. The bolts 30 fit through slots 31 in the side rails 28 so that the location of the wheels 16 can be varied along the longitudinal extent of the frame.

Levers 32 are attached at one of their ends to the tips of the caster shanks 22. The other ends of the levers are rotatably attached to a tie-rod 34. Thus, the wheels 16 can be rotated between a right-hand orientation, FIG. 3, and a left-hand orientation, FIG. 2, by translating the tie-rod transversely to the side rails 28. When the wheels are in their right-hand orientation they will cause the frame to move along the rollers toward the right when the rollers rotate, and when the wheels are in their left-hand orientation the frame will move toward the left.

A spring 36, which extends between the tie-rod 34 and the front crossbar 26, normally urges the wheels to the right-hand orientation. Located on the left-hand side of the frame 14 is a latch 38 which engages the left-hand lever 32a when the wheels are moved to their left-hand orientation and prevents them from returning to their right-hand orientation. The latch 38 comprises an arm 39 which is rotatably mounted intermediate its ends on a platform 40. Located on one end of the arm 39 is an engagement roller 42 which engages the end of the lever 32a when the arm is rotated clockwise against a stop 41 and the wheels are in their left-hand orientation. A spring 44, which extends between the engagement roller end of the arm and the frame normally urges the arm toward this clockwise position. When the arm is rotated counterclockwise against the spring 44 the engagement roller disengages the lever 32a and permits the wheels to rotate back to their right-hand position. The outer corner of the tip 46 of the lever 32a is curved to facilitate its being moved past the engagement roller 42 when the wheels are being moved to their left-hand orientation and its inner corner is tapered to facilitate release of the lever when the arm 39 is rotated counterclockwise. Located on the other end of the arm 39 is a release roller 48 which contacts the support 50 (FIG. 4), in which the rollers 10 are journaled, and releases the latch 38, when the apparatus has traversed to the far left-hand side of the rollers.

Attached across the ends of the side rails 28, by means of bolts 52, is an elongate hone 54 which rests on top of one of the rollers 10 to support the apparatus. The hone is a flat bar which preferably is made from a low carbon steel, such as 1018, which is plated to prevent oxidation. The bottom of the bar is electroplated with a diamond dust to provide the hone surface. While a 15$\mu$ diamond dust works well for most applications a finer or coarser grit can be used depending on the degree of cleaning which is required.

Attached to the side rails 28, immediately in front of the hone 54, is a ballast plate 56 which urges the hone 54 against the rollers 10. The ballast plate 56 is attached to the side rails 28 by means of bolts 58 thereby making it easily replaceable. Thus, ballast plates having different weights can be used depending on the circumstances. Generally, more weight is required for coarser grits and less weight is required for finer grits. In any event, the weight must be sufficient to make the hone clean the roller and yet not stick to it.

In order to provide flexibility in the cleaning apparatus, so that it will work on rollers which are uneven or not aligned parallel with one another, the front cross element 26, the hone 54, and the ballast plate 56 are mounted movably to the side rails 28. Referring to FIG. 5 (which refers to the ballast plate 56 and the bolts 58) this is accomplished by providing the bolts 30, 52 and 58 with shoulders 60 which are thicker than the elements they attach. Thus, the elements are not pulled tight against the side rails by the bolts.

In order to clean the roller being honed, water is distributed across the roller immediately before it passes under the hone. This is accomplished with an elongate distribution tube 62 which has a series of small holes 64 located in its underside. The distribution tube is attached to a water tank 66 through a hose 68 having a shutoff valve 70 located in it. In the preferred embodiment illustrated, the water tank 66 is located on a platform 72 directly above the wheels to provide sufficient weight on the wheels so that they will cause the device to translate across the rollers as they rotate and to prevent them from walking up out of the rollers.

The cleaning apparatus of the present invention is used to clean the rollers in their normal environment. As a result the time and expense of removing the rollers for cleaning is eliminated. In cases where the rollers are heated, such as when they transport glass in a tempering furnace, they must cool sufficiently so that they do not cause the wheels to melt, but they need not cool completely to room temperature.

Before using the apparatus the separation between the wheels 16 and the hone 54 must first be adjusted so that the hone rests on the top of a roller 10 when the wheels are positioned between another adjacent set of rollers. The wheels then are moved to their left-hand orientation where the retention roller 42 of the latch 38 engages the left-hand lever 32a thereby locking the wheels in this orientation. The apparatus is placed at the right-hand side of the rollers 10 with the hone 54 being on the first roller which is to be cleaned. The rollers 10 are rotated in their normal manner so that there is relative movement between the roller and the hone, thereby allowing the hone to clean the roller. In addition, as the rollers rotate the wheels 16 cause the apparatus to translate along the rollers towards the left. Thus, the hone cleans the entire roller.

After the apparatus has been placed on the rollers the valve 70 is opened to permit water from the tank 66 to flow through the holes 64 in the distribution tube 62 onto the roller being cleaned. Since the roller passes under the distribution tube before passing under the hone, the roller is wet when the hone works on it so that the material removed by the hone is washed away.

When the apparatus has moved completely across the rollers 10 the release roller 48 strikes the support 50 causing the arm 39 to rotate counterclockwise and pull the retention roller 42 off of the lever 32a. When the lever 32a is released the spring 36 causes the wheels to move to their right-hand orientation and the apparatus starts to move across the rollers toward the right. When the apparatus has again completely transversed the rollers it is manually lifted off of them, the wheels are moved to their left-hand orientation, the hone is placed on the next roller, and the process is repeated.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for cleaning a series of material handling rollers which are rotatably mounted side-by-side on parallel axes with each roller being separated from each adjacent roller by a similar predetermined distance, said apparatus comprising:
   (a) a frame;
   (b) a hone mounted on said frame;
   (c) a pair of wheels mounted on said frame, and having rolling axes about which they rotate, said wheels having a diameter which permits them to contact both of a pair of adjacent rollers when placed therebetween;
   (d) said wheels being separated from and oriented relative to said hone such that when said wheels are placed in an operative position between an adjacent pair of said rollers said hone is positioned on another one of said rollers;
   (e) said wheels normally being oriented in a first position where said rolling axes are parallel with one another and are angled with respect to the axes of said rollers so that when said wheels are placed in said operative position and said rollers are rotated said frame will translate across said rollers.

2. The apparatus in claim 1, including means for changing the amount said wheels are separated from said hone.

3. The apparatus of claim 1, including means for distributing water onto the roller said hone is positioned on before said roller passes under said hone.

4. The apparatus of claim 3 wherein said hone is an elongate strip and said means for distributing water includes an elongate distribution tube which is mounted on said frame immediately adjacent to said hone, and has a series of openings defined therein.

5. The apparatus of claim 4 wherein said means for distributing water further includes a tank, which is mounted on said frame, and means for fluidly connecting said tank to said distribution tube.

6. The apparatus of claim 5 wherein said tank is located substantially above said wheels.

7. The apparatus of claim 1, including means for rotating said wheels about pivot axes which are perpendicular with said rolling axes after said frame has translated completely across said rollers to a second position which causes said frame to translate across said rollers in the opposite direction.

8. The apparatus of claim 7 wherein said means for rotating comprises:
   (a) shanks which are journaled in said frame;
   (b) means for interconnecting said shanks so that said wheels rotate about said pivot axes together;
   (c) biasing means for normally urging said wheels toward said second position;
   (d) latching means for holding said wheels in said first position; and
   (e) release means for releasing said latching means after said frame has translated completely across said rollers with said wheels in said first position.

9. The apparatus of claim 1, including a ballast plate which is releasably attached to said frame proximate said hone.

10. Apparatus for cleaning a series of material handling rollers which are rotatably mounted side-by-side on parallel axes with each roller being separated from each adjacent roller by a similar predetermined distance, said apparatus comprising:
    (a) a frame;
    (b) a hone mounted on said frame;
    (c) a pair of wheels mounted on said frame and having a diameter which permits them to contact both of a pair of said adjacent rollers when placed therebetween;
    (d) said wheels being separated from and oriented relative to said hone such that when said wheels are placed in an operative position between an adjacent pair of said rollers said hone is positioned on another one of said rollers;
    (e) means for distributing water onto the roller said hone is positioned on, adjacent to said hone.

11. The apparatus of claim 10 wherein said hone is an elongate strip having a longitudinal axis which is coaxial with the axes of said rollers and said means for distributing water comprises a distribution tube which is located adjacent to said hone.

12. The apparatus of claim 10 wherein said distribution tube is located on the side of said hone where a longitudinal line on said roller will pass said distribution tube before it passes said hone when said roller rotates.

* * * * *

UNITED STATES PATENT AND TRADEMARK OFFICE
CERTIFICATE OF CORRECTION

PATENT NO. : 4,767,438

DATED : August 30, 1988

INVENTOR(S) : William G. Bates

It is certified that error appears in the above-identified patent and that said Letters Patent is hereby corrected as shown below:

On the Cover Sheet     Change "Mroczek, Inc., Sellersville, Pa." to read --Mroczek, Inc., Vancouver, Wa.--.

Col. 3, Line 23     After "rollers" insert --10--.

Signed and Sealed this

Thirty-first Day of July, 1990

*Attest:*

HARRY F. MANBECK, JR.

*Attesting Officer*     *Commissioner of Patents and Trademarks*